No. 766,809. PATENTED AUG. 9, 1904.
J. R. CARTER.
MECHANICAL MOVEMENT.
APPLICATION FILED FEB. 13, 1903.
NO MODEL. 2 SHEETS—SHEET 1.
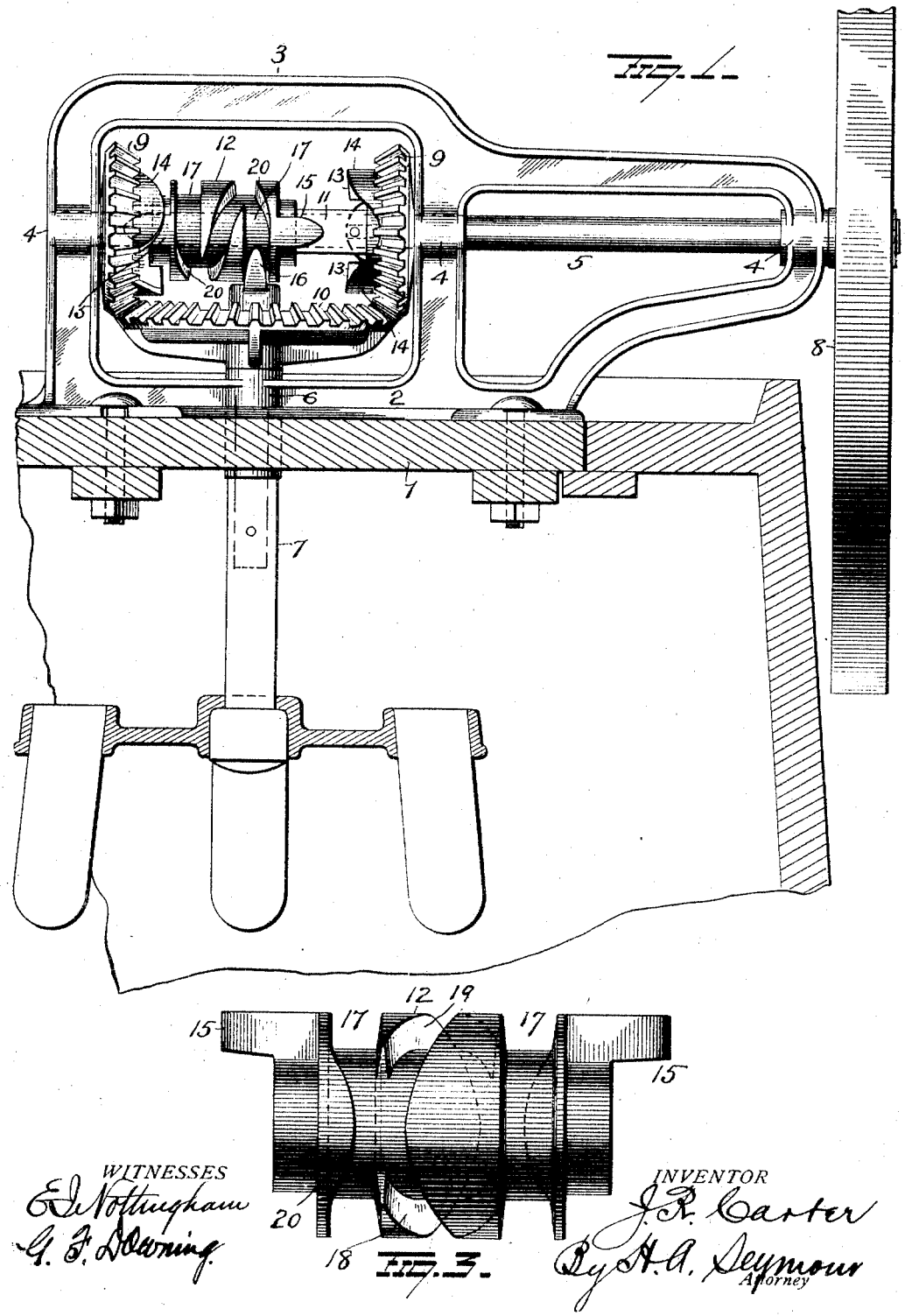

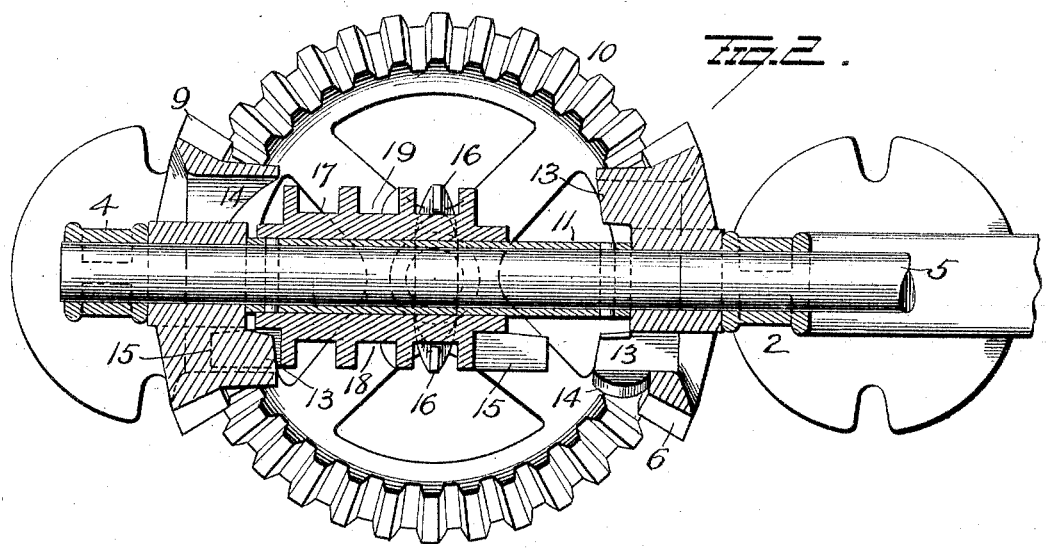
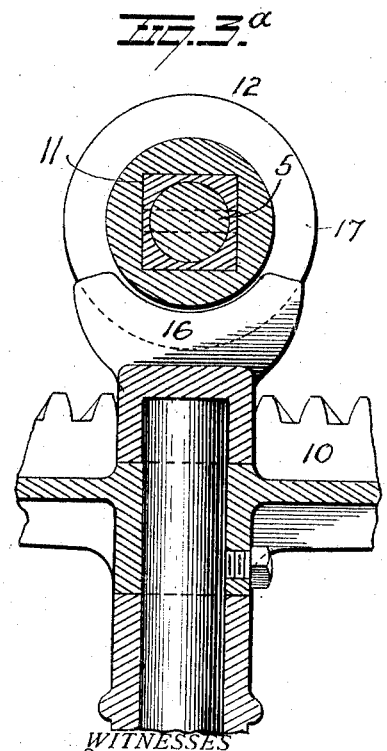
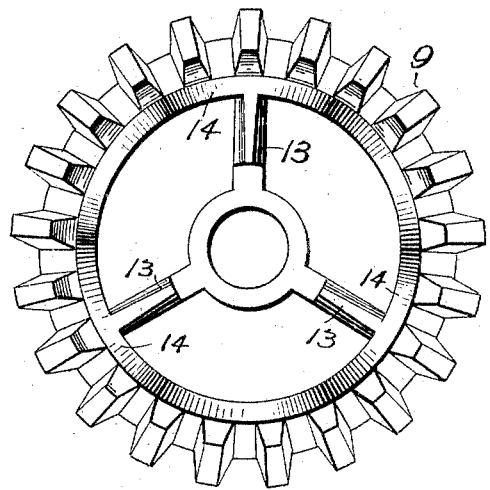

No. 766,809. Patented August 9, 1904.

UNITED STATES PATENT OFFICE.

JOHN R. CARTER, OF AUGUSTA, KENTUCKY, ASSIGNOR TO ERNST H. HUENEFELD, OF CINCINNATI, OHIO.

MECHANICAL MOVEMENT.

SPECIFICATION forming part of Letters Patent No. 766,809, dated August 9, 1904.

Application filed February 13, 1903. Serial No. 143,246. (No model.)

*To all whom it may concern:*

Be it known that I, JOHN R. CARTER, a resident of Augusta, in the county of Bracken and State of Kentucky, have invented certain new and useful Improvements in Mechanical Movements; and I do hereby declare the following to be a full, clear, and exact description of the invention, such as will enable others skilled in the art to which it appertains to make and use the same.

My invention relates to an improved mechanical movement, the object of the invention being to provide an improved movement in which a drive-shaft continuously revolved in either direction will alternately revolve a driven shaft in reverse directions. This is accomplished by means of gears loose on the drive-shaft meshing with a pinion secured upon the driven shaft and said gears alternately locked to the drive-shaft by a sliding clutch between them. This clutch is operated by a shifter carried by the driven shaft and mounted in a peculiarly-shaped groove or grooves in the clutch which will so time the shift of the clutch as to compel more than a complete revolution of the drive-shaft to shift the clutch, and I so regulate the relative sizes of the gears and pinion as to compel the drive-shaft to turn more than a complete revolution to turn the driven shaft less than a complete revolution. As found by long experience, such a movement of the driven shaft when employed as the dasher or agitator-rod of a washing-machine will accomplish the best possible results, and while I consider the clutch construction the most important feature of my improvements there are other features of novelty and novel combinations and arrangements of parts, as will be more fully hereinafter described, and pointed out in the claim.

In the accompanying drawings, Figure 1 is a view in side elevation, illustrating my improvements. Fig. 2 is a view in longitudinal section. Figs. 3 and 3ª are detail views of the clutch, and Fig. 4 is a detail view of one of the gears 9.

1 represents a washing-machine cover or other support on which the base-plate 2 of a frame 3 is secured. This frame 3 provides alined bearing 4 for a horizontal driven shaft 5, and base-plate 2 is made with a bearing 6 for a vertical driven shaft 7, which forms the dasher or agitator-rod of a washing-machine. The drive-shaft 5 has secured on its outer end a hand-wheel 8 or other suitable driver and has loosely mounted thereon in frame 3 beveled gears 9, spaced apart, facing each other, and both meshing with a large beveled pinion 10, secured upon driven shaft 7.

The shaft 5 has secured thereon between gears 9 a square or angular tube 11, on which my improved clutch 12, having a square or angular bore, is mounted to slide, but compelled to turn with the shaft. The gears 9 are made on their adjacent faces with radially-disposed lugs 13, strengthened by flanges 14, and against these lugs 13 lugs 15 on the ends of clutch 12 are adapted to strike and compel the gear to turn with the clutch and drive-shaft. Of course other forms of clutch engagement might be employed, and the clutch 12 might be mounted to slide on shaft 5, with angular tube 11 dispensed with, and while I prefer the construction shown and described I do not wish to be limited thereto.

A clutch-shifter 16 is rotatably supported on the end of driven shaft 7 projecting above pinion 10, and is mounted in the peculiarly-shaped groove or grooves of the clutch, as will now be explained and as is clearly shown in Fig. 3. The clutch is made at both ends with annular grooves 17, which are connected by diagonal grooves or passages 18 and 19 on opposite sides of the clutch and disposed at the same angles, and the end side wall of each end groove 17 is made cam-shaped, as shown at 20, to guide the shifter 16 into the diagonal groove 18 or 19, according to the direction of rotation of the clutch. This construction, or rather location, of the several grooves 17, 18, and 19 not only serves to throw the clutch from locked engagement with one gear 9 to the other, but also serves to hold the clutch in engagement with a gear without longitudinal movement of the clutch for a complete revolution thereof and then begins the sliding movement of the clutch as the shifter moves from an end groove 17 into the groove 18 or 19. This sliding movement is rapid after it once begins, enabling one gear, 9, to be rapidly thrown out of clutch when the other is almost simultaneously locked to turn with the drive-shaft.

The operation of my improvements is as follows: The drive-shaft 5 is continuously revolved in either direction to continuously rotate clutch 12, keyed to slide thereon. As shifter 16 is in the grooves of the clutch, the revolution of the clutch will cause it to be moved from locked engagement from one gear 9 to the other, as above explained, and as both gears 9 are in mesh with pinion 10 first one is a driver and the other an idler, and vice versa, and thus alternately revolve driven shaft 7 in reverse directions.

My improvements are extremely simple, as there are but four parts to each—namely, the gears 9, which may be cast exactly alike and from the same pattern, the pinion 10, and clutch 12. The parts are easily assembled, not liable to get out of order, are compact and comparatively light, and the working parts are closely assembled and well adapted for the reception of a protective casing.

Various changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

The combination with a drive-shaft, a driven shaft, a gear secured to the driven shaft, gears loose on the drive-shaft, each loose gear having a series of radial clutch-lugs, and strengthening-ribs for said lugs, of a clutch-sleeve mounted to slide on the drive-shaft between the gears thereon, said sleeve having an elongated finger on each end to coöperate with the clutch-sections on the loose gears, said clutch-sleeve having two annular grooves at its ends and two intermediate elongated, diagonal grooves communicating with the annular grooves at opposite sides of the sleeve, and one wall of each annular groove bulged inwardly substantially as shown where the annular grooves communicate with the diagonal grooves, and a shifter pivoted to the driven shaft and operating in the grooves in the clutch-sleeve.

In testimony whereof I have signed this specification in the presence of two subscribing witnesses.

JOHN R. CARTER.

Witnesses:
S. W. FOSTER,
R. S. FERGUSON.